United States Patent [19]
Nash

[11] Patent Number: 5,820,188
[45] Date of Patent: Oct. 13, 1998

[54] TRUCK BED EXTENDER APPARATUS

[76] Inventor: Kevin M. Nash, 2635 Lakewest Dr., Chico, Calif. 95928

[21] Appl. No.: 604,341

[22] Filed: Feb. 21, 1996

[51] Int. Cl.⁶ .................................................. B62D 33/06
[52] U.S. Cl. ............................................ 296/26; 296/57.1
[58] Field of Search .............................. 296/26, 27, 37.6, 296/50, 51, 57.1, 60, 61

[56] References Cited

U.S. PATENT DOCUMENTS

| | | |
|---|---|---|
| 2,872,239 | 2/1959 | Bowness et al. . |
| 4,472,639 | 9/1984 | Bianchi . |
| 4,531,773 | 7/1985 | Smith . |
| 4,778,213 | 10/1988 | Palmer . |
| 4,815,787 | 3/1989 | Hale ........................................ 296/167 |
| 5,154,470 | 10/1992 | Bringman, Jr. . |
| 5,228,739 | 7/1993 | Love .................................... 296/167 X |
| 5,456,511 | 10/1995 | Webber . |
| 5,468,038 | 11/1995 | Sauri . |

FOREIGN PATENT DOCUMENTS

1244858  11/1988  Canada .

Primary Examiner—Gary C. Hoge
Attorney, Agent, or Firm—John P. O'Banion

[57] ABSTRACT

A truck bed extender having a pair of generally parallel, spaced apart side walls which are joined to a back wall, and having an open top and an open bottom. A pair of forward pointing plates or tabs are coupled to the side walls, with the forward pointing plates generally structured and configured to slidably engage slots defined by the strike plates and truck bed walls of a pickup truck. A pair of downward pointing plates or tabs, each including an opening for a latch bolt, are also coupled to the side walls, with the downward pointing plates structured and configured to slidably engage the slots defined by the latch plates and sides of the tail ate of a pickup truck.

15 Claims, 6 Drawing Sheets

TRUCK BED EXTENDER APPARATUS

BACKGROUND OF THE INVENTION

1. Field of the Invention

This invention pertains generally to devices and methods for extending the length of a truck bed, and more particularly to a truck bed extender apparatus which is detachably mounted on a tail gate through use of the conventional tail gate latching mechanism present on pickup trucks.

2. Description of the Background Art

Pickup trucks and like automotive vehicles generally have a tail gate pivotally mounted at the back end of a truck bed which can be lowered or dropped down to facilitate the loading and unloading of freight or other items from the truck bed. However, a common problem experienced in hauling loads with pickup trucks is that the truck bed is not long enough to accommodate particular freight items or loads to be transported. While the tail gate of the truck can be left open during transportation to accommodate freight items which are longer than the truck bed, an open tail gate creates a risk of losing freight and can cause potential road hazards due to lost freight items lying on roadways.

Numerous devices have been developed to utilize the open tail gate of a truck to provide an extension of the truck bed. Common truck bed extension devices typically include a back wall pivotally coupled to the back or end of the open tail gate and side walls which extend from the walls of the truck bed out to the back wall. Such truck bed extensions, however, have proved deficient in various respects. One particular problem with currently known truck bed extensions is that they tend to be difficult to attach to truck tail gate assemblies, and are correspondingly difficult to remove from the tail gate assembly when the extension is not needed. Further, most conventional truck bed extension devices require expensive, permanent modification of the truck tail gate and/or truck bed walls in order to attach the extension. Such modifications frequently require addition of brackets, hinges, fastening mechanisms, or other intrusive hardware to the truck bed walls and/or tail gate assembly which are undesirable when the truck bed extension is not in use.

Accordingly, there is a need for a truck bed extender apparatus which can be quickly and easily attached to and removed from the tail gate of a truck and which can be used with existing truck tail gate assemblies without modification thereof. The present invention satisfies these needs, as well as others, and generally overcomes the deficiencies found in conventional devices.

SUMMARY OF THE INVENTION

The present invention is a truck bed extender which can be quickly and easily attached to, and detached from, the tail gate of standard pickup trucks or like vehicles, and which is coupled directly to the latching mechanism of the tail gate without requiring modification of the tail gate or other portions of the truck. In general terms, the invention comprises a back wall, a pair of side walls coupled to the back wall, and an open top and open bottom. A pair of forward pointing plates or tabs mounted on the side walls slidably engage slots defined by the strike plates of the tail gate latching mechanism and the walls of the truck bed. A pair of downward pointing plates or tabs mounted on the side walls slidably engage the latch bolt and slots between the latch plates and sides of the open tail gate.

By way of example and not of limitation, the back wall generally includes first and second sides, and the side walls include front and back ends. The back ends of the side walls are coupled to the sides of the back wall, with the side walls generally parallel to and spaced apart from each other. The downwardly disposed plates are generally adjacent bottom edges of the first and second sides, and include openings which engage the latch bolts in the tail gate. The forwardly disposed plates are positioned adjacent the front ends of the side walls. Padding or cushioning may be used along the lower edge of the back plate and side plates to prevent scratching of the tail gate finish.

The tail gate extender comprising the present invention is utilized by lowering the tail gate of the pickup truck or like vehicle, and inserting or sliding the forwardly disposed plates or tabs on the side walls into the slots defined by the strike plates and the ends of the truck bed walls. Then, the downwardly disposed plates or tabs on the side walls are inserted into the slots defined by the latch plates and sides of the tail gate so that the tail gate latch bolts engage the holes in the downward pointing plates. The extender may be removed by disengaging the latch bolts from the holes in the downward pointing plates, and then disengaging the downward pointing plates from the slots defined by the latch plates and tail gate sides and disengaging the forward pointing plates from the slots formed by the strike plates and ends of the truck bed walls. Thus, the tail gate extender comprising the invention is detachably mounted onto the tail gate through use of the existing tail gate latching mechanism, and does not require addition of hinges, brackets or other intrusive hardware to the tail gate in order to use the invention.

An object of the invention is to provide a truck bed extender apparatus which can be quickly and easily installed on and removed from the tail gate area of pickup trucks and other vehicles having a dropping tail gate.

Another object of the invention is to provide a truck bed extender apparatus which couples to the latching mechanism of standard truck tail gates.

Another object of the invention is to provide a truck bed extender apparatus which can be used without modification of the tail gate assembly, truck bed, or other parts of the pickup truck.

Another object of the invention is to provide a truck bed extender apparatus which is easy and inexpensive to manufacture.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Referring more specifically to the drawings, for illustrative purposes the present invention is embodied in the apparatus generally shown in FIG. 1 through FIG. 6. It will be appreciated that the apparatus may vary as to configuration and as to details of the parts without departing from the basic concepts as disclosed herein. The invention is disclosed in terms of a conventional pickup truck or light truck. It should be readily understood, however, that the invention may be used with other types of vehicles which include a dropping tail gate arrangement.

Figure 1:
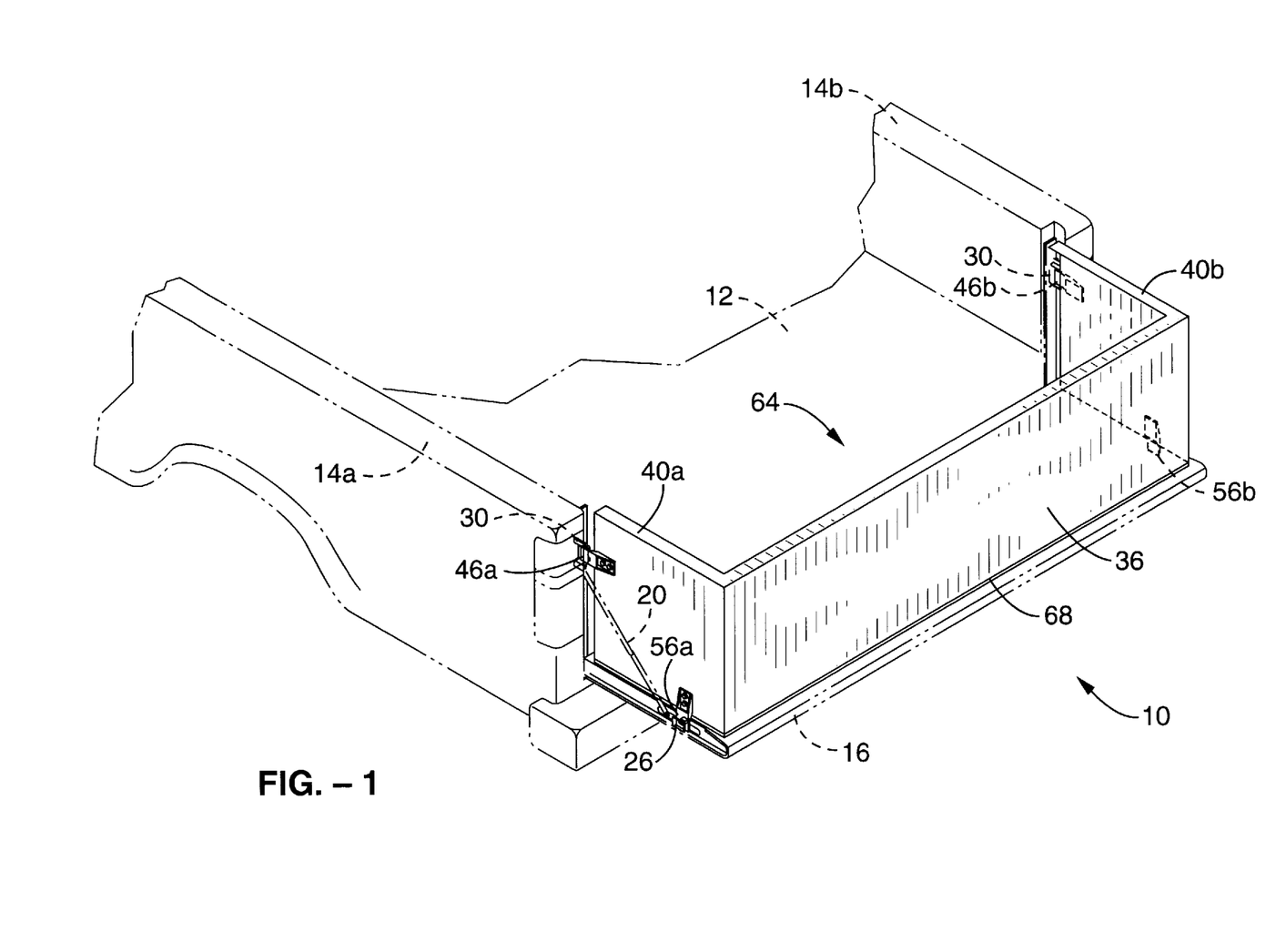
FIG. 1 is a perspective view of a truck bed extender apparatus in accordance with the present invention, shown mounted on the tail gate of a truck.
Figure 2:
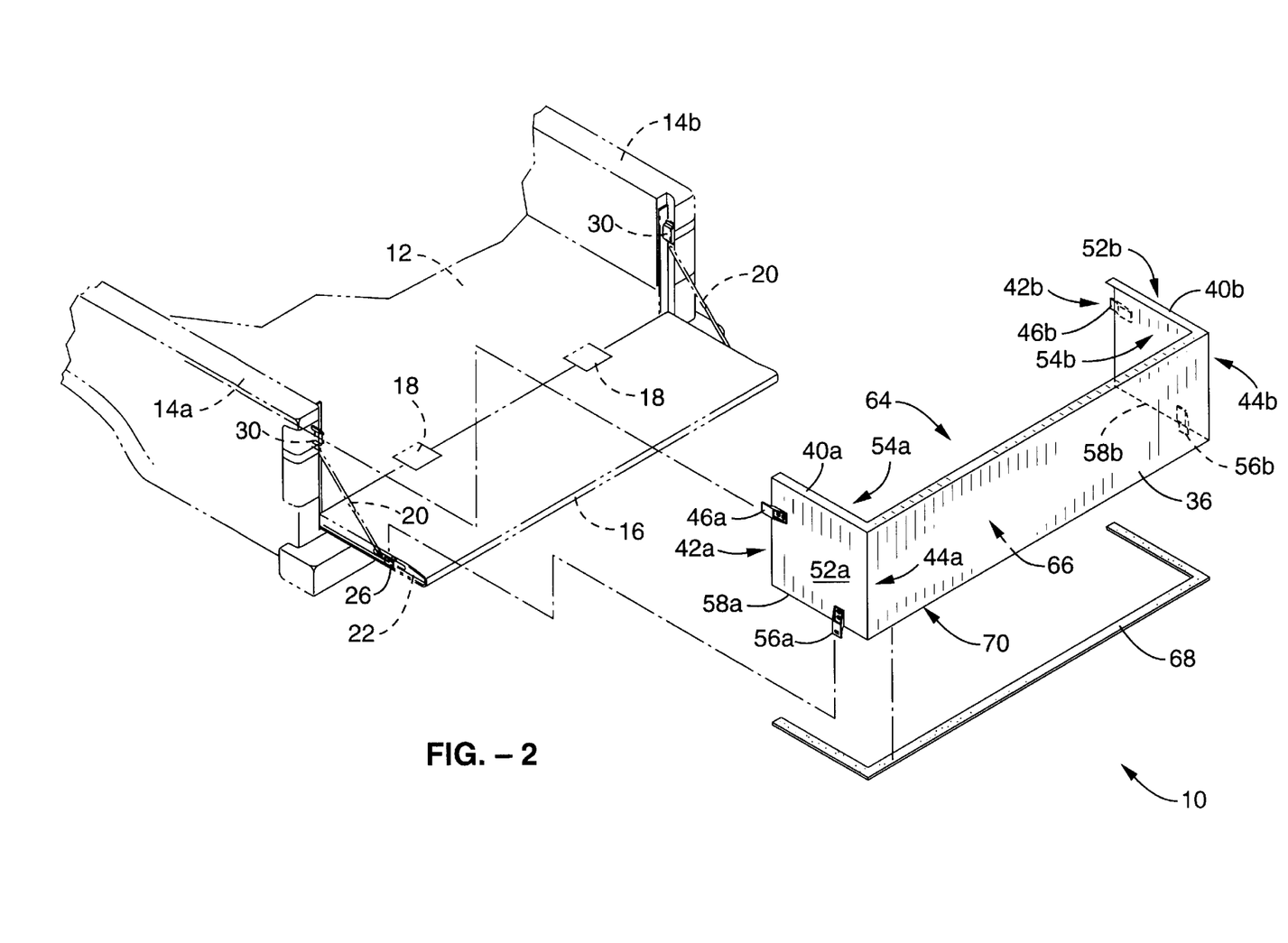
FIG. 2 is an exploded view of the assembly shown in FIG. 1

Referring first to FIG. 1 and FIG. 2, a truck bed extender apparatus 10 in accordance with the present invention is generally shown. The extender apparatus 10 is used generally with pickup trucks or like vehicles which have a truck bed 12 with walls 14a, 14b and a drop down tail gate 16 pivotally attached to truck bed 12 by hinges 18 or like hardware. Tail gate 16 is typically attached to truck bed side walls 14a, 14b by brace assemblies 20 which are pivotally attached to the sides 22 of tail gate 16 and to truck bed walls 14a, 14b in a conventional fashion.

Figure 3:
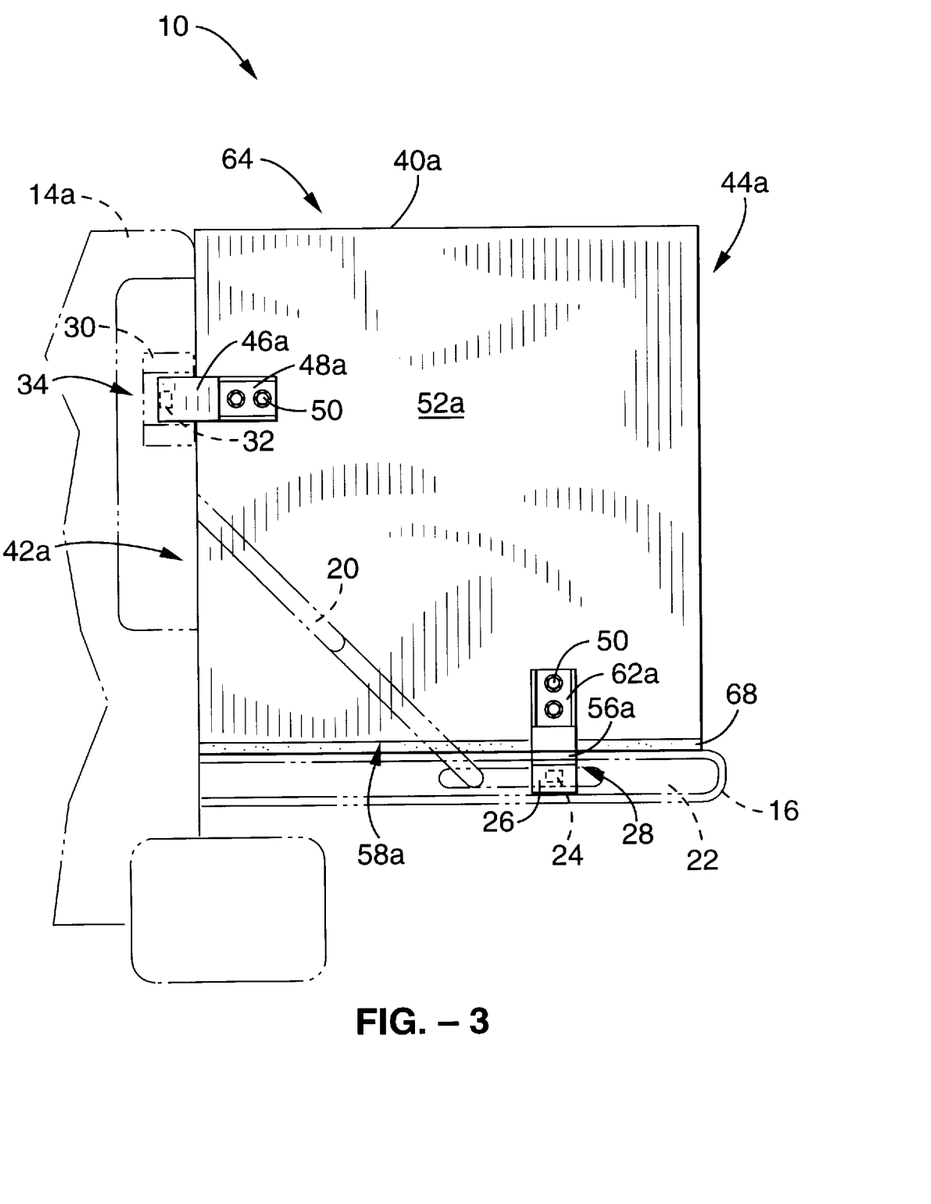
FIG. 3 is a side view of the truck bed extender apparatus and tail gate of FIG. 1.
Figure 4:
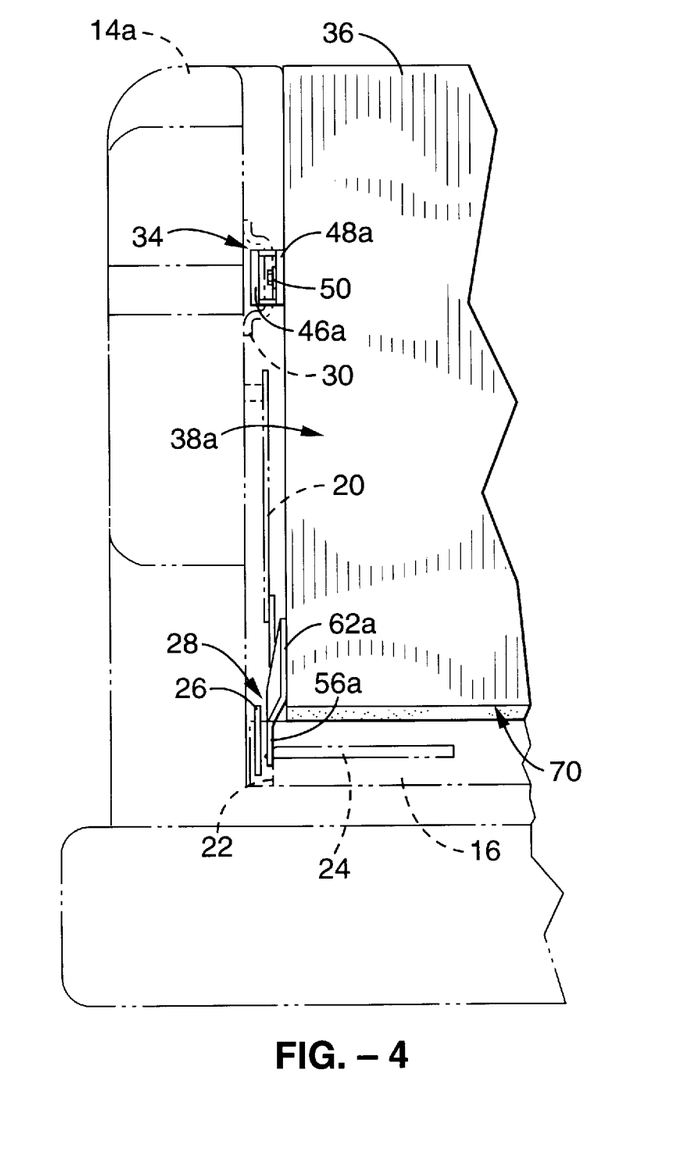
FIG. 4 is a rear view of one edge of the truck bed extender and tail gate of FIG. 1.
Figure 5:
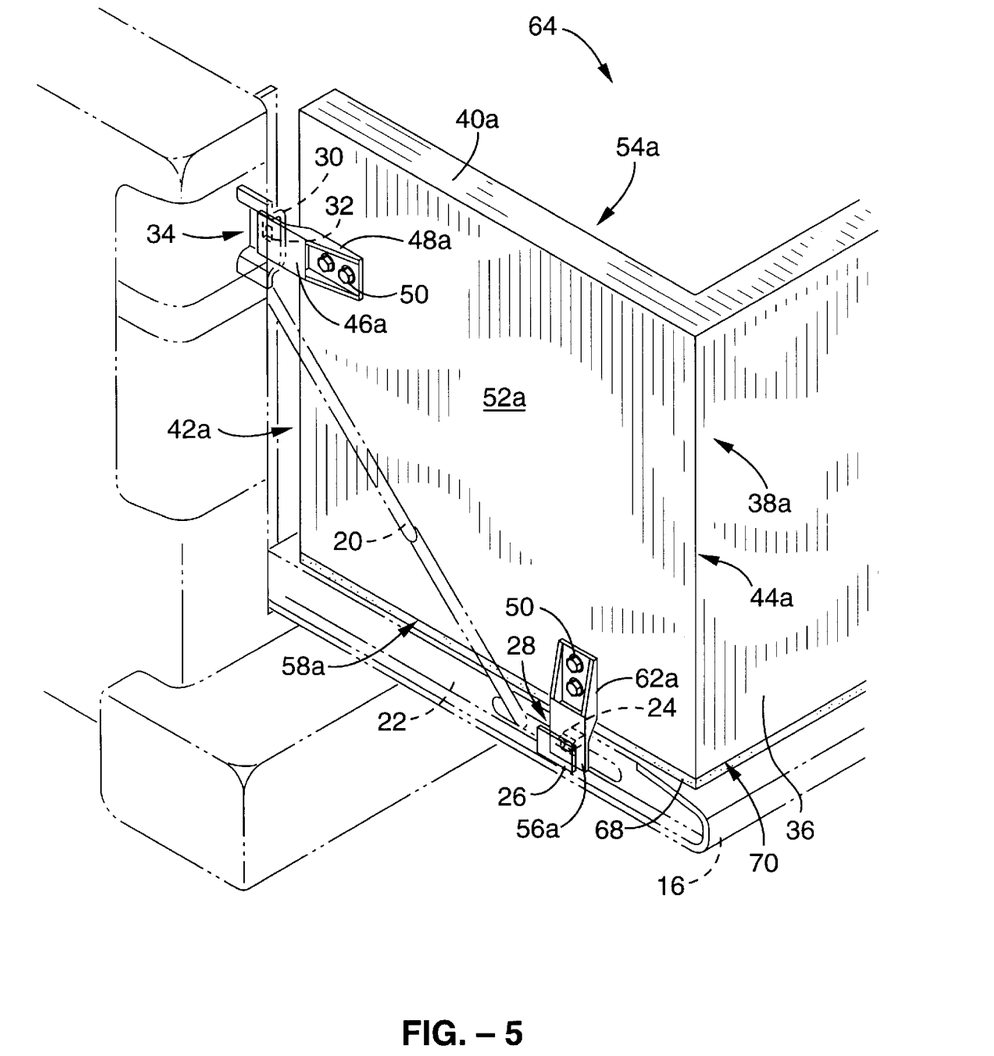
FIG. 5 is a perspective view in detail of the coupling arrangement for the truck bed extender apparatus and tail gate of FIG. 1.

Referring more particularly to FIG. 3 through FIG. 5, as well as FIG. 1 and FIG. 2, a conventional tail gate latching arrangement or assembly for pickup trucks and like vehicles generally includes a latch bolt 24 located on each side 22 of tail gate 16 and a latch plate 26 coupled to each side 22 adjacent latch bolt 24. The latching arrangement also includes a conventional latching mechanism (not shown) which is internal to tail gate 16 and which is mechanically interfaced with latch bolts 24. Slots 28 are generally defined between latch plates 26 and the adjacent sides 22 of tail gate 16, with latch bolts 24 positioned in slots 28. The standard latching arrangement additionally includes a pair of strike plates 30 of generally U-shaped cross-section, with a strike plate 30 coupled to each truck bed wall 14. Openings 32 are included on strike plates 30, with openings 32 structured and configured to receive latch bolts 24 when tail gate 16 is closed. Slots 34 are generally defined between strike plates 30 and the adjacent truck bed side walls 14a, 14b.

Figure 6:
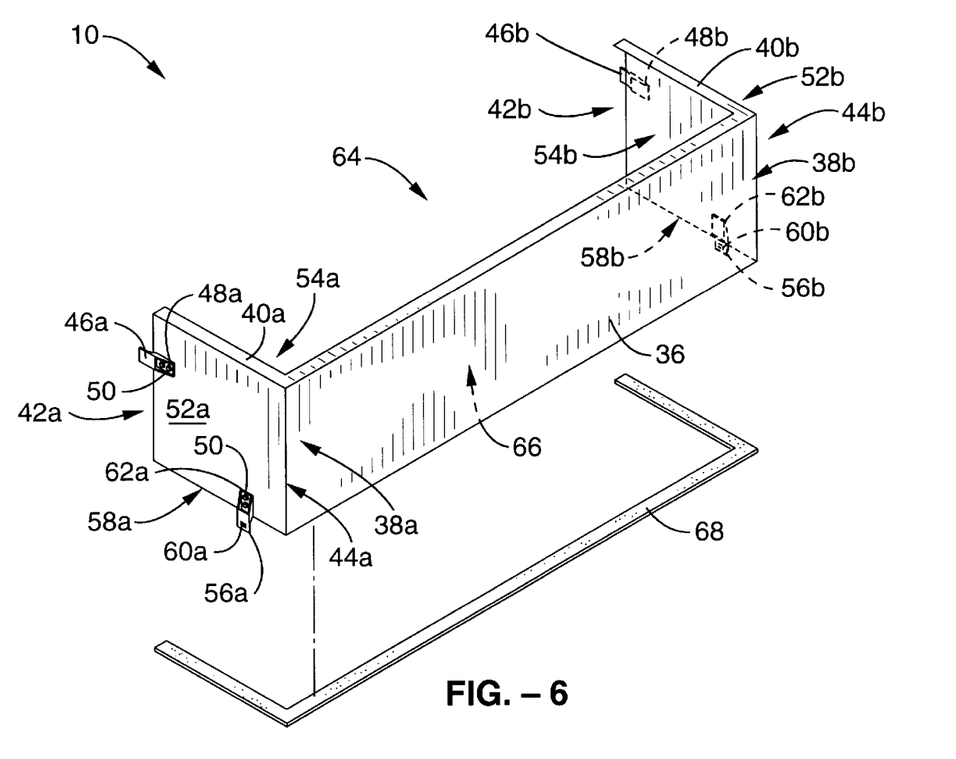
FIG. 6 is an exploded view of the truck bed extender apparatus of the invention.

Referring more particularly to FIG. 6 as well as FIG. 1 through FIG. 5 generally, the truck bed extender 10 comprising the invention includes a back wall 36 with first and second ends 38a, 38b, and first and second side walls 40a, 40b. First side wall 40a generally includes a front end 42a and a back end 44a, and second side wall 40b likewise has a front end 42b and a back end 44b. First and second side walls 40a, 40b are coupled or joined to back wall 36, preferably with side walls 40a, 40b substantially parallel to each other and substantially perpendicular to back wall 36, to define a generally rectangular shape for truck bed extender 10. Side walls 40a, 40b are preferably spaced apart from each other at a distance generally equal to the distance between walls 14a, 14b of truck bed 12. Preferably, side walls 40a, 40b are joined to back wall 36 such that back end 44a of first side wall 40a is generally adjacent first end 38a of back wall 36, and back end 44b of second side wall 40b is generally adjacent second end 38b of back wall 36. Side walls 40a, 40b and/or back wall 36 may be angled relative to one another to provide non-rectangular configurations for truck bed extender 10, if desired.

The invention also includes first and second forwardly disposed or forward pointing plates or tabs 46a, 46b, with plate 46a coupled to first side wall 40a adjacent front end 42a, and plate 46b coupled to second side wall 40b adjacent front end 42b. Preferably, plate 46a is coupled to side wall 40a by a mounting base 48a, and plate 46b is coupled to side wall 40b by mounting base 48b. Mounting bases 48a, 48b are joined to side walls 40a, 40b by bolts 50 or like attachment hardware or welds. Forward pointing plates 46a, 46b extend outward and forward from front ends 42a, 42b of side walls 40a, 40b respectively, and are structured and configured to slidably and reversibly engage the slots 34 defined by strike plates 30 and truck walls 14a, 14b. Forward pointing plates 46a, 46b are preferably mounted on the outer surfaces 52a, 52b of side walls 40a, 40b as shown, but may alternatively be mounted on inner surfaces 54a, 54b of side walls 40a, 40b respectively, or may be partially embedded within the material of side walls 40a, 40b such that forwardly disposed plates 46a, 46b are generally co-planar with side walls 40a, 40b respectively.

Also provided with the invention are first and second downwardly disposed or downward pointing plates or tabs 56a, 56b, which are coupled to first and second side walls 40a, 40b adjacent bottom or lower edges 58a, 58b respectively. Holes or apertures 60a, 60b are provided in plates 56a, 56b respectively, with apertures 60a, 60b structured and configured to receive latch bolts 24 as discussed below. Downward pointing plates 56a, 56b preferably are coupled to side walls 40a, 40b by mounting bases 62a, 62b respectively, which are held onto side walls by bolts 50 or other standard attachment hardware. Downward pointing plates 56a, 56b extend downward and outward from lower edges 58a, 58b of side walls 40a, 40b, and are generally structured and configured to slidably and reversibly engage the slots 28 defined by latch plates 26 and sides 22 on tail gate 16. As with forward pointing plates 46a, 46b, downward pointing plates 56a, 56b are preferably mounted on the outer surfaces 52a, 52b of side walls 40a, 40b as shown. However, downward pointing plates 56a, 56b could be mounted on inner surfaces 54a, 54b of side walls 40a, 40b or partially embedded within the material of side walls 40a, 40b.

It will be appreciated that forward pointing plates 46a, 46b must be properly aligned to engage slots 34 in strike plates 30, and that downward pointing plates 56a, 56b must be properly aligned to engage slots 28 in latch plates 26 and to receive latch bolts 24 through apertures 60. Accordingly, bolts 50 could be made to extend into elongated holes in first and second side walls 40a, 40b or, alternatively, the holes in plates 46a, 46b, 56a, 56b through which bolts 50 extend could be made elongated to provide for either lateral or vertical adjustment to align the plates in relation to strike plates 30, latch plates 26 and/or latch bolts 24.

The side walls 40a, 40b and back wall 36 of truck bed extender 10 preferably define a generally rectangular, box-like structure and configuration for truck bed extender 10, with an open top 64 and an open bottom 66. A cushioning strip 68 may be included with the truck bed extender 10, to prevent scratching of the finish on tail gate 16 if desired. Cushioning strip 68 is preferably made of a resilient polymeric foam material such as polyurethane, and is attached to truck bed extender 10 along bottom edges 58a, 58b of side walls 40a, 40b, and bottom edge 70 of back wall.

Side walls 40a, 40b and back wall 36 are preferably made of sheet metal, polymeric material, polymer composite material, wood, particle board, or other material of suitable durability for use in retaining freight within truck bed 12. Side walls 40a, 40b and back wall 36 may be joined together by brackets, adhesives, welds, bolts, clamps, clips, or other standard coupling means. Alternatively, side walls 40a, 40b and back wall 36 may be integral portions of a single piece of metallic or polymeric material which has been bent into appropriate shape. It is also contemplated that side walls 40a, 40b could be pivotally coupled to back wall so that the extender apparatus may be folded up for storage while not in use.

The invention is quickly and easily installed on the tail gate 16 of a pickup truck or like vehicle by lowering or dropping tail gate 16 into the open position, and then sliding or inserting forwardly disposed plates or tabs 46a, 46b into slots 34 between strike plates 30 and truck bed walls 14a, 14b, with front ends 42a, 42b of side walls 40a, 40b positioned generally adjacent to truck bed walls 14a, 14b. Then, downwardly disposed plates or tabs 56a, 56b are inserted into slots 28 between latch plates 26 and tail gate sides 22, and latch bolts 24 are engaged in apertures 60a, 60b. The truck bed extender 10 with forward pointing and downward pointing plates 46a, 46b, 56a, 56b thus attached is positioned with bottom edges 58a, 58b of side walls 40a, 40b and bottom edge 70 of back wall 36 adjacent the open tail gate 16, with the open bottom 66 of the apparatus 10 generally adjacent to tail gate 16. The latch bolts 24 engaged in apertures 60a, 60b lock the apparatus 10 into place and prevent shifting or movement of the truck bed extender 10 during travel which could otherwise cause forward pointing and/or downward pointing plates 46a, 46b, 56a, 56b from disengaging slots 28, 34. While thus positioned, back wall 36 serves the function of a closed tail gate, side walls 40a, 40b serve generally as extensions of truck bed walls 14a, 14b, and the open tail gate serves an extension of the truck bed 12, thereby allowing the transport of freight items which are too long to be accommodated by the truck bed 12 when tail gate 16 is closed. Side walls 40a, 40b and back wall 36 thus provide barriers which prevent freight items from being lost from the truck bed 12 which could otherwise occur if the freight items were transported on the truck bed 12 with tail gate 16 open.

The truck bed extender apparatus 10 is quickly and easily detached or removed from tail gate 16 by disengaging latch bolts 24 from apertures 60a, 60b in downward pointing plates 56a, 56b by actuating the handle (not shown) in tail gate, and then disengaging downward pointing plates 56a, 56b from slots 28 and disengaging forward pointing plates 46a, 46b from slots 34. The detached truck bed extension 10 may be stored within the vehicle on truck bed 12 while not in use. As mentioned above, no additional brackets, hinges or other fastening hardware are required for attachment of truck bed extender apparatus 10 to tail gate 16 and truck bed walls 14a, 14b, as are generally required by conventional truck bed extension devices.

The relative dimensions of side walls 40a, 40b and back wall 36 may be varied as required to accommodate different sizes, types or models of pickup truck or other vehicle. The size and structure and configuration of forward pointing and downward pointing plates 46a, 46b, 56a, 56b, as well as their relative locations on side walls 40a, 40b may likewise be varied as necessary to accommodate the location of slots 28, 34 on different models, makes or types of truck. As mentioned above, side walls 40a, 40b and back wall 36 may be angled relative to each other to form a non-rectangular structure, and may be angled such that open top 64 is wider than open bottom 66. The general structure, configuration and dimension of truck bed extender 10 may thus be varied as required for different applications of the invention.

Accordingly, it will be seen that this invention provides a truck bed extension apparatus which is quick and easy to install and remove, and which does not require modification of truck tail gate assemblies for installation. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A truck bed extender apparatus for a truck of the type having a pair of opposing truck bed walls, a pair of opposing strike plates coupled to said truck bed walls wherein a horizontal latch slot is formed between each said strike plate and each said truck bed wall, tail gate having sides, a pair of latch plates coupled to said sides of said tail gate wherein a vertical latch slot is formed between said tailgate and each said latch plate, and a pair of slidable latch bolts disposed in said tailgate, each said latch bolt positioned adjacent to a latch plate, wherein said latch bolts engage said strike plates when said tailgate is in a closed position, said truck bed extender apparatus comprising:

(a) a back wall;
   (b) a pair of opposing side walls, said side walls joined to said back wall;
   (c) a pair of forwardly disposed plates, one said forwardly disposed plate coupled to each said side wall, wherein each said forwardly disposed plate is capable of being slidably received by one of said vertical latch slots in said truck; and
   (d) a pair of downwardly disposed plates, each said downwardly disposed plate including an aperture, one said downwardly disposed plate coupled to each said side wall, wherein each said downwardly disposed plate is capable of being slidably received by one of said horizontal latch slots in said truck and wherein each said aperture in said downwardly disposed plates is capable of slidably receiving one of said latch bolts in said tailgate.

2. A truck bed extender apparatus as recited in claim 1, wherein each said side wall includes a front end and a back end, said side walls joined to said back wall adjacent said back ends.

3. A truck bed extender apparatus as recited in claim 2, wherein said forwardly disposed plates are coupled to said side walls adjacent said front ends.

4. A truck bed extender apparatus as recited in claim 1, wherein said side walls each include an outer surface, said forwardly disposed plates coupled to said outer surfaces of said side walls, said downwardly disposed plates coupled to said outer surfaces of said side walls.

5. A truck bed extender apparatus as recited in claim 1, wherein said side walls each include a bottom edge, said downwardly disposed plates coupled to said side walls adjacent said bottom edges.

6. A truck bed extender apparatus as recited in claim 1, wherein said back wall includes first and second ends, said side walls coupled to said back wall adjacent said first and second ends.

7. A truck bed extender apparatus as recited in claim 1, wherein said side walls are parallel to and spaced apart from each other.

8. A truck bed extender apparatus for a truck of the type having a pair of opposing truck bed walls, a pair of opposing strike plates coupled to said truck bed walls wherein a horizontal latch slot is formed between each said strike plate and each said truck bed wall, tail gate having sides, a pair of latch plates coupled to said sides of said tail gate wherein a vertical latch slot is formed between said tailgate and each said latch plate, and a pair of slidable latch bolts disposed in said tailgate, each said latch bolt positioned adjacent to a latch plate, wherein said latch bolts engage said strike plates when said tailgate is in a closed position, said truck bed extender apparatus comprising:

(a) a back wall, said back wall including first and second ends;

(b) a first side wall, said first side wall including front and back ends, said back end of said first side wall joined to said back wall adjacent said first end;

(c) a second side wall, said second side wall including front and back ends, said back end of said second side wall joined to said back wall adjacent said second end;

(d) a pair of forwardly disposed plates, one said forwardly disposed plate coupled to said first side wall adjacent said front end, one said forwardly disposed plate coupled to said second side wall adjacent said front end, wherein each said forwardly disposed plate is capable of being slidably received by one of said vertical latch slots in said truck; and (e) a pair of downwardly disposed plates, each said downwardly disposed plate including an aperture, one said downwardly disposed plate coupled to said first side wall, one said downwardly disposed plate coupled to said second side wall, wherein each said downwardly disposed plate is capable of being slidably received by one of said horizontal latch slots in said truck and wherein each said aperture in said downwardly disposed plates is capable of slidably receiving a latch bolt in said tailgate.

9. A truck bed extender apparatus as recited in claim 8, wherein said first and second side walls each include an outer surface, said forwardly disposed plates coupled to said outer surfaces of said side walls, said downwardly disposed plates coupled to said outer surfaces of said side walls.

10. A truck bed extender apparatus as recited in claim 8, wherein said side walls are parallel to and spaced apart from each other.

11. A truck bed extender apparatus as recited in claim 8, wherein said side walls each include a bottom edge, said downwardly disposed plates coupled to said side walls adjacent said bottom edges.

12. A truck bed extender apparatus for a truck of the type having a pair of opposing truck bed walls, a pair of opposing strike plates coupled to said truck bed walls wherein a horizontal latch slot is formed between each said strike plate and each said truck bed wall, tail gate having sides, a pair of latch plates coupled to said sides of said tail gate wherein a vertical latch slot is formed between said tailgate and each said latch plate, and a pair of slidable latch bolts disposed in said tailgate, each said latch bolt positioned adjacent to a latch plate, wherein said latch bolts engage said strike plates when said tailgate is in a closed position, said truck bed extender apparatus comprising:

(a) a back wall, said back wall including first and second ends;

(b) a first side wall, said first side wall including front and back ends, said back end of said first side wall joined to said first end of said back wall;

(c) a second side wall, said second side wall including front and back ends, said back end of said second side wall joined to said second end of said back wall, said second side wall substantially parallel to said first side wall, said second side wall spaced apart from said first side wall;

(d) first and second forwardly disposed plates, said first forwardly disposed plate coupled to said first side wall adjacent said front end, said second forwardly disposed plate coupled to said second side wall adjacent said front end, wherein each said forwardly disposed plate is capable of being slidably received by one of said vertical latch slots in said truck; and (e) first and second downwardly disposed plates, said first and second downwardly disposed plates each including an aperture, said first downwardly disposed plate coupled to said first side wall, said second downwardly disposed plate coupled to said second side wall, wherein each said downwardly disposed plate is capable of being slidably received by one of said horizontal latch slots in said truck and wherein each said aperture in said downwardly disposed plates is capable of slidably receiving a latch bolt in said tailgate.

13. A truck bed extender apparatus as recited in claim 12, wherein said first and second side walls each include an outer surface, said first and second forwardly disposed plates coupled to said outer surfaces of said first and second side walls, said first and second downwardly disposed plates coupled to said outer surfaces of said first and second side walls.

14. A truck bed extender apparatus as recited in claim 12, wherein said first and second side walls each include a bottom edge, said first and second downwardly disposed plates coupled to said first and second side walls adjacent said bottom edges.

15. A truck bed extender apparatus as recited in claim 12, further comprising an open top and an open bottom.

* * * * *